(12) United States Patent
Mayer et al.

(10) Patent No.: US 12,162,223 B2
(45) Date of Patent: Dec. 10, 2024

(54) ELECTROWELD FITTING

(71) Applicant: Georg Fischer Wavin AG, Schaffhausen (CH)

(72) Inventors: Karl-Heinz Mayer, Singen (DE); Jonas Huessy, Neunkirch (CH)

(73) Assignee: GEORG FISCHER WAVIN AG, Schaffhausen (CH)

(*) Notice: Subject to any disclaimer, the term of this patent is extended or adjusted under 35 U.S.C. 154(b) by 933 days.

(21) Appl. No.: 17/170,932

(22) Filed: Feb. 9, 2021

(65) Prior Publication Data

US 2021/0245446 A1  Aug. 12, 2021

(30) Foreign Application Priority Data

Feb. 11, 2020  (EP) ..................... 20156525

(51) Int. Cl.
 *B29C 65/22* (2006.01)
 *B29C 45/14* (2006.01)

(52) U.S. Cl.
 CPC ...... *B29C 65/222* (2013.01); *B29C 45/14008* (2013.01); *B29C 65/228* (2013.01)

(58) Field of Classification Search
 CPC .............. B29C 65/222; B29C 65/228; B29C 45/14008
 USPC ..................... 219/236, 214, 279.1
 See application file for complete search history.

(56) References Cited

U.S. PATENT DOCUMENTS

| | | | | |
|---|---|---|---|---|
| 4,642,155 A | * | 2/1987 | Ramsey | B29C 65/342 |
| | | | | 285/21.2 |
| 5,990,462 A | * | 11/1999 | Scholl | B29C 66/52292 |
| | | | | 219/535 |
| 10,563,806 B2 | * | 2/2020 | Mencos | B29C 66/5221 |
| 2010/0025991 A1 | * | 2/2010 | Kim | F16L 19/086 |
| | | | | 285/370 |
| 2015/0210823 A1 | * | 7/2015 | Uliel | B29C 66/73921 |
| | | | | 285/21.2 |
| 2018/0272616 A1 | * | 9/2018 | Pionetti | B29C 66/73921 |
| 2018/0299045 A1 | * | 10/2018 | Nakata | F16L 55/027 |
| 2019/0283338 A1 | * | 9/2019 | Pionetti | B29C 66/5221 |

FOREIGN PATENT DOCUMENTS

| | | | |
|---|---|---|---|
| CH | 553368 A | | 8/1974 |
| DE | 2311279 A1 | | 11/1974 |
| DE | 102013009687 A1 | | 12/2014 |
| EP | 0919761 A1 | | 6/1999 |
| GB | 2137026 A | | 9/1984 |
| JP | 2002257284 A | * | 9/2002 |
| WO | WO 2010071589 A1 | | 12/2009 |

* cited by examiner

Primary Examiner — Eric S Stapleton
Assistant Examiner — Yeong Juen Thong
(74) Attorney, Agent, or Firm — LEYDIG, VOIT & MAYER, LTD.

(57) ABSTRACT

An electroweld fitting is made of plastic material for welding plastic pipelines. The electroweld fitting has: a cylindrical body having a longitudinal axis; a heating wire winding; contacts configured to conduct an electric current; and a pipe stop. The pipe stop is arranged on an inner lateral surface of the cylindrical body. The pipe stop is flexible and resilient. The cylindrical body and the pipe stop arranged thereon are a one piece injection molded part. The heating wire winding is an embedded wire in the inner lateral surface of the cylindrical body.

14 Claims, 4 Drawing Sheets

ELECTROWELD FITTING

CROSS REFERENCE TO PRIOR APPLICATION

Priority is claimed to European Patent Application No. EP 20 156 525. 6, filed on Feb. 11, 2020, the entire disclosure of which is hereby incorporated by reference herein.

FIELD

The present invention relates to an electroweld fitting made of plastic material for welding plastic pipelines and a production method thereof.

BACKGROUND

Especially in recent years, pipelines made of thermoplastic materials have been increasingly used in pipeline construction for weight and corrosion reasons, in particular for the construction of pipeline networks for gas and water supply and for conveying air, waste water, or chemicals. The pipelines used are usually made of pressure-resistant plastic material. To connect such pipelines, electroweld fittings are often used for efficiency reasons, which electroweld fittings have a heating wire winding in the interior in order to weld the pipes to the fitting.

To ascertain during assembly whether the pipe ends have been pushed sufficiently deep into the electroweld fitting, the fitting has a stop in the interior. As a result of the stop, the assembly operator is able to ascertain that the pipe end has been pushed in as far as the desired position. This is disadvantageous if such an electroweld fitting is to be assembled as a slip-on fitting. This means that the electroweld fitting is firstly pushed virtually completely over the one pipe end and then in the opposite direction over the second pipe end. In order to be able to carry out this type of assembly, the stop must always be removed first. This involves a high degree of additional effort and is usually not easy to implement because the fitting is readily damaged on its inner diameter. The production of two different fittings, i.e. one with a stop and one without a stop, is not economically justifiable because injection molding tools are expensive to purchase and service, especially because it would be necessary to adapt to different diameters.

GB 2137026A discloses an electroweld fitting with four fixed stops on the inner diameter of the fitting. It can thus be ascertained during assembly whether the pipe ends have been pushed sufficiently deep into the fitting. This is disadvantageous in that, due to the assembly as a slip-on fitting and as a result of the stable design of the stops, when the stops in the fitting have to be removed this is a complex procedure in which the inner lateral surface can also be damaged and can result in the wire escaping.

SUMMARY

In an embodiment, the present invention provides an electroweld fitting that is made of plastic material for welding plastic pipelines. The electroweld fitting has: a cylindrical body having a longitudinal axis; a heating wire winding; contacts configured to conduct an electric current; and a pipe stop. The pipe stop is arranged on an inner lateral surface of the cylindrical body. The pipe stop is flexible and resilient. The cylindrical body and the pipe stop arranged thereon are a one piece injection molded part. The heating wire winding is an embedded wire in the inner lateral surface of the cylindrical body.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
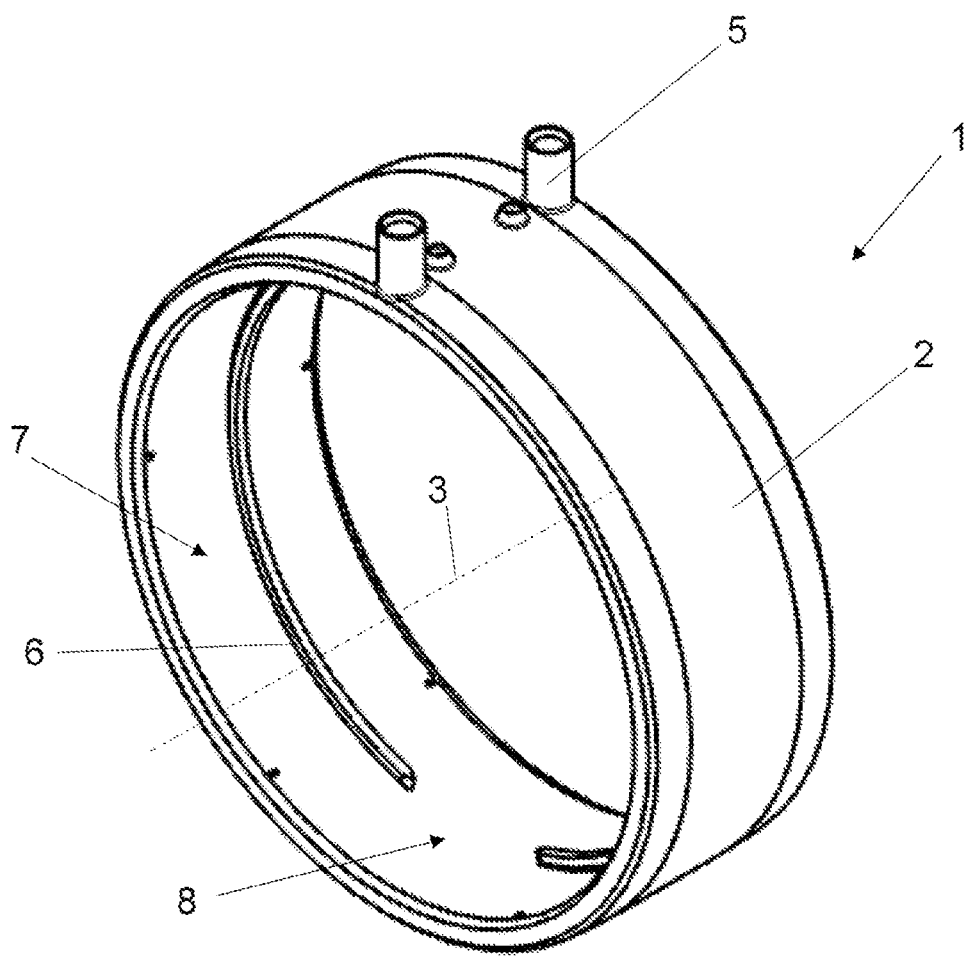
FIG. 1 shows a three-dimensional view of an electroweld fitting according to the invention.

In an embodiment, the present invention provides an electroweld fitting and a production method thereof, which can be reliably used for the different assembly types without a high degree of additional effort.

In an embodiment of the present invention, a cylindrical body and a pipe stop arranged thereon are produced in one piece in an injection molding method, and a heating wire winding is subsequently incorporated by embedding a wire in the inner lateral surface of the cylindrical body.

The electroweld fitting made of plastic material for welding plastic pipelines may have a cylindrical body. The electroweld fittings may also include reduction fittings in addition to the fittings formed with a constant diameter. The body of the electroweld fittings is preferably produced from a thermoplastic material. The electroweld fitting has a longitudinal axis, a heating wire winding and contacts for supplying the electric current. The electroweld fitting may have a pipe stop, wherein the pipe stop is arranged on the inner lateral surface of the body. This serves for determining, and delimiting, the insertion depth of the pipe ends in the electroweld fitting. The pipe stop is designed to be flexible and resilient. This means, when the pipe end is pushed as far as the pipe stop in the direction of the longitudinal axis on one side of the body, the pipe stop is tilted onto the other side by the pipe end which presses on the stop, until the stop then abuts or lies against the inner lateral surface, whereby a stable pipe stop is ensured. As a result of the resilient configuration of the pipe stop, it is ensured that the pipe stop is arranged or mounted on the inner lateral surface of the body by means of a simple, unstable connection and can therefore be simply removed as required. The pipe stop nevertheless forms a stable stop for the pipe ends. The stop should therefore have a stable construction on the one hand, but it must be simple to remove on the other.

It is advantageous if the pipe stop is resiliently deformable in the direction of the longitudinal axis. This ensures a simple attachment of the pipe stop to the inner lateral surface but still forms a stable stop when the pipe stop is tilted into an end position.

It has been shown to be advantageous if the pipe stop can be tilted until a rigid position is achieved, the rigid position is preferably established as a result of the inner lateral surface.

The pipe stop preferably extends at least along a region of the circumference of the inner lateral surface. The pipe stop preferably extends on the inner circumference of the electric fitting or the body over at least a certain arc, whereby the pipe stop does not extend over the entire inner circumference. As a result of the pipe stop, it is ensured that the pipe end is only inserted as far as the pipe stop.

It is advantageous if the pipe stop has at least one slot along its course on the circumference of the inner lateral surface. It is thus ensured that the heating wire can be embedded in the body in one procedure. The heating wire is embedded on one side of the electrical welding fitting through a plurality of windings to form a heating zone, and likewise on the other side of the electroweld fitting. So that the same wire can be embedded in the two heating zones and in one operation, the pipe stop has a slot along the course of the circumference on the inner lateral surface. This slot enables the heating wire, by means of its embedding, to be guided to the other side of the fitting where the second heating zone is installed.

It has been shown to be a preferred embodiment if the pipe stop is arranged in the center of the body in the direction of the longitudinal axis. The two pipe ends can thus be pushed in towards the center. Other asymmetrical bodies are also within the scope of embodiments of the present invention.

It has been shown to be advantageous if the pipe stop is arranged on an electroweld fitting which is designed as a reduction fitting, wherein the pipe stop is arranged at the end of the heating zone of the narrower or smaller inner diameter of the reduction fitting. This means that the pipe stop is located between the two heating zones with the different inner diameters and is arranged at the end of the heating zone with the smaller inner diameter. This also enables a stop for the smaller pipe end pushed in on one side.

The pipe stop preferably has a foot and a head, and the head and the foot of the pipe stop are clearly visible in the cross-section of the pipe stop. The cross-section with the head and foot of the pipe stop then extends over the course thereof.

It is advantageous if the foot is arranged on the inner lateral surface of the body and has a narrower width in the direction of the longitudinal axis than the head. The pipe stop and the body are formed in one piece and are produced in the same injection molding process or the pipe stop is injection molded directly onto the inner lateral surface. The cross-section of the pipe stop preferably extends in a constant or uniform manner over the course along the circumference of the inner lateral surface or at least over a sub-region of the circumference. As a result of designing the foot as a narrow web, the pipe stop can also be easily removed, whereby the electroweld fitting can also be used as a slip-on fitting. As a result of the more solid head, it is nevertheless ensured that the pipe end lies against the pipe stop as soon as the pipe stop tilts towards the inner lateral surface of the electroweld fitting or body.

It is advantageous if a predetermined breaking point is arranged at the foot of the pipe stop, wherein the predetermined breaking point is preferably arranged in each case at the end and at the start of the pipe stop, which extends at least along a region of the circumference of the inner lateral surface. The pre-determined breaking point enables even easier removal of the pipe stop in that a reduction in the cross-section of the foot is arranged at the start and at the end of its course, wherein this reduction in cross-section only extends over a short section of the course of the pipe stop.

It has been shown to be an advantageous embodiment if the width of the head tapers in the direction of the foot. The stop thus has the required resilience but is nevertheless a stable stop.

It has been shown to be advantageous if the taper at the head is formed by an angle between the foot and the head, wherein the angle $\alpha$ is preferably>than 90°. It is thus ensured that the pipe stop can tilt in the direction of the inner lateral surface and abuts against this and thereby forms a stop for the inserted pipe ends.

It has been shown to be advantageous if the angle is arranged on both sides of the head. When assembling the pipe end, there is therefore no need to consider from which side the first pipe end is introduced.

The heating wire winding preferably has two heating zones, wherein the heating zones each have a plurality of windings, wherein the two heating zones are connected to one another. Both heating zones are arranged respectively on the right and left of the pipe stop. So that one heating wire can be used for both heating zones and the embedding of the wire can take place in one operating step, the embedded wire runs between the two heating zones in the region of the slot in the pipe stop and crosses through the center of the fitting in the region of the slot.

An exemplary embodiment of the invention is described with reference to the figures, wherein the invention is not restricted to the exemplary embodiment.

The drawing illustrated in FIG. 1 shows a three-dimensional view of an electroweld fitting 1 according to an embodiment of the invention. The electroweld fitting 1 has a body 2, wherein the body 2 is preferably produced from a weldable plastic material. The body 2 has a cylindrical form, wherein this extends about a longitudinal axis 3, wherein the cylindrical form can be stepped in the case of a reduction fitting.

Figure 4:
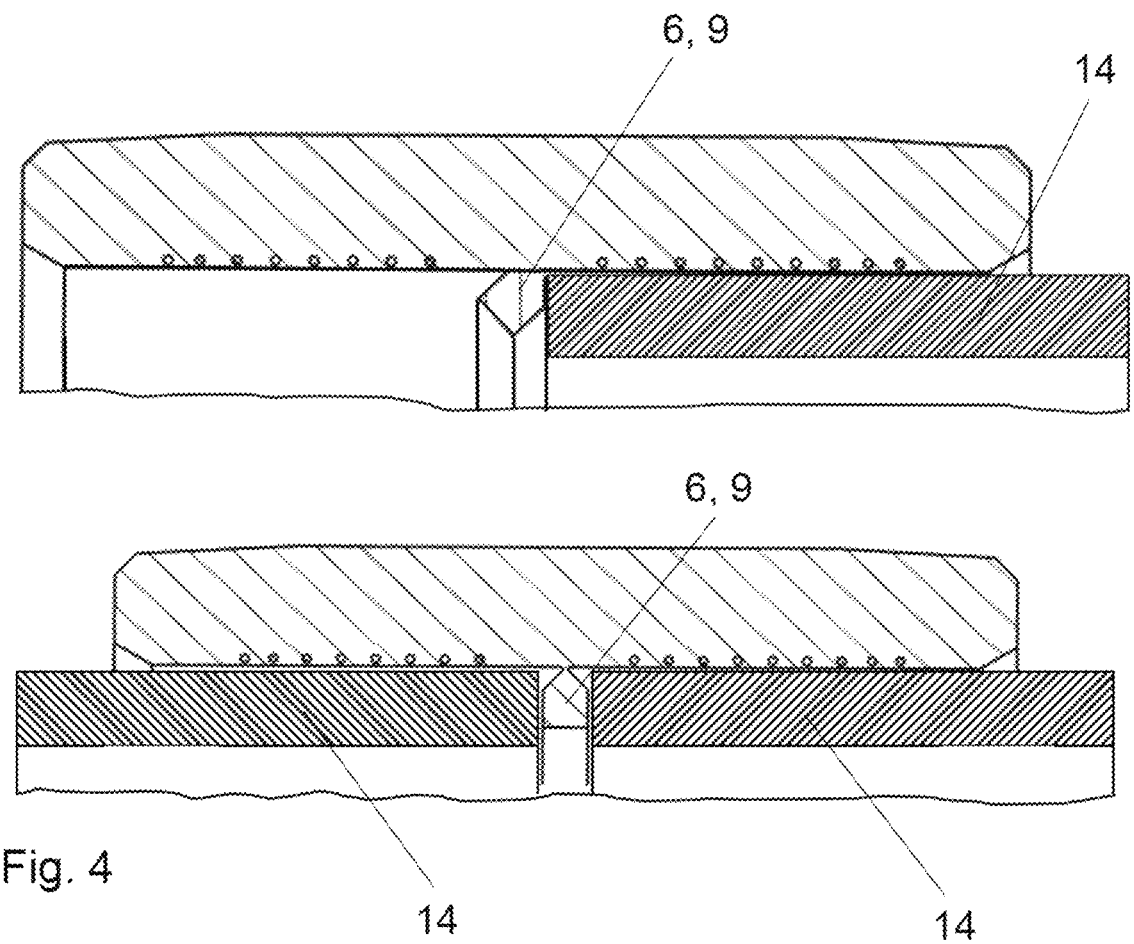
FIG. 4 shows two longitudinal sections with pushed-in pipe ends.

A heating wire winding for heating the plastic material and welding the body 2 to the inserted pipe ends 14 is arranged in the body 2, as seen in FIG. 4. A pipe stop 6 is arranged on the inner lateral surface 7 of the inventive electroweld fitting 1. This serves to ensure that the pipe ends 14 are pushed in as far as the pipe stop 6 in order to achieve good welding, which is carried out over the maximum surface.

Because the electroweld fitting 1 shall also be usable as a slip-on fitting, the pipe stop 6 is simple to remove without subsequent damage to the inner lateral surface 7. This is achieved in that the pipe stop 6 is designed to be flexible and resilient. The pipe stop 6 can thus be easily removed without hard and rigid residues remaining on the inner lateral surface 7 or having to be removed with a tool, which could result in damage to the inner lateral surface 7.

Figure 5:
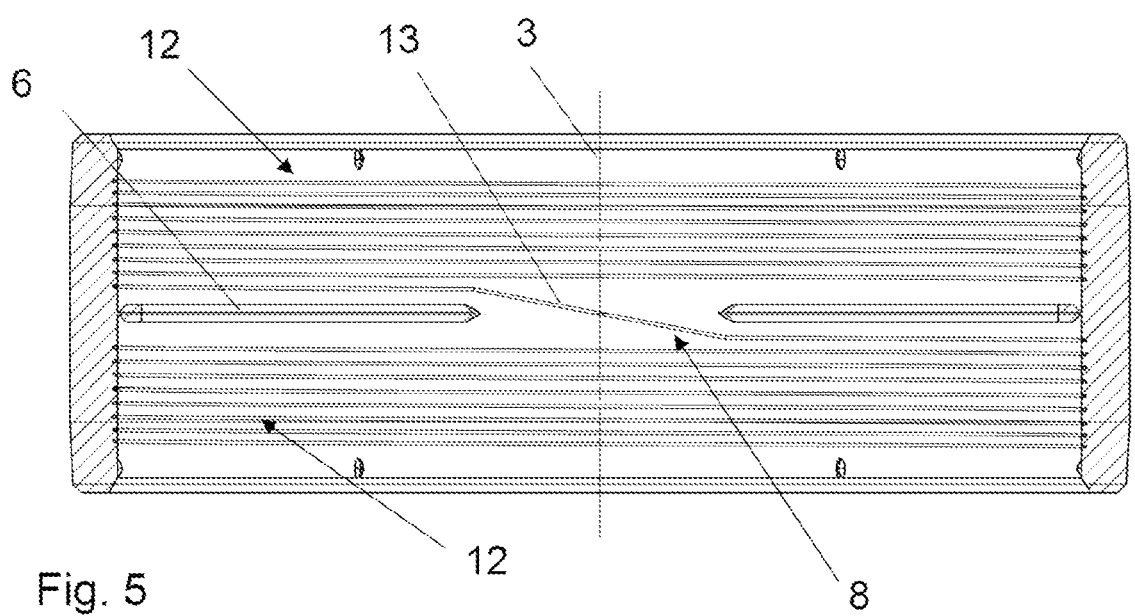
FIG. 5 shows a longitudinal section through an electroweld fitting in which the course of the heating wire is included.
Figure 6A:
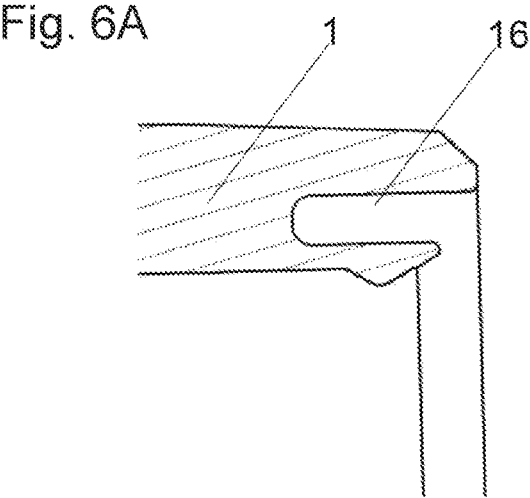
FIG. 6a and FIG. 6b show various forms of the tolerance bridging means between the pipe end and the electroweld fitting.
Figure 6A:
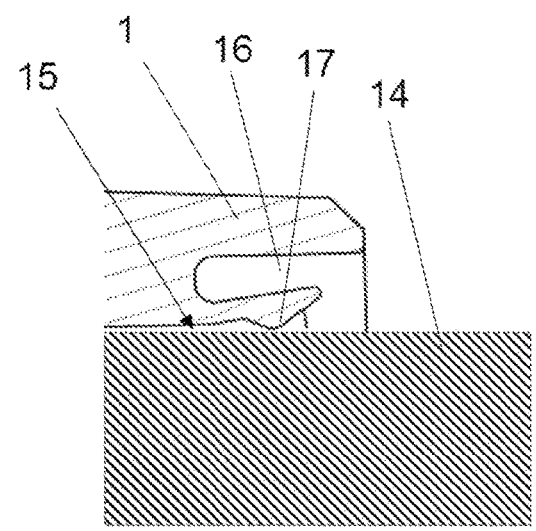
Figure 6B:
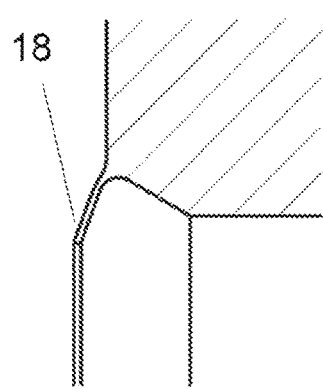
Figure 6B:
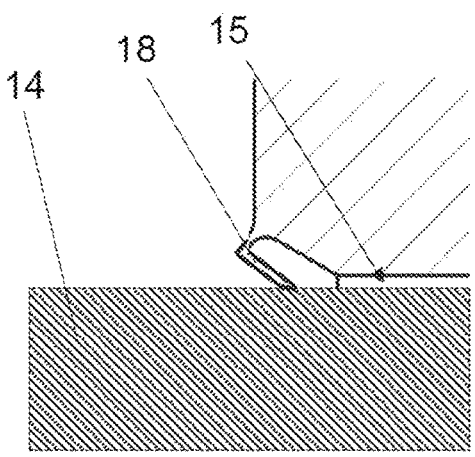

It is also shown in FIG. 1 that a slot 8 is present in the pipe stop 6 extending along the inner circumference. This enables continuous embedding of the heating wire 13 in the body 2. This means that it is possible to start with the embedding of the heating wire 13 to form the first heating zone 12 at one end of the body 2. The heating wire 13, by means of its embedding, passes through the slot 8 in the center and the second heating zone 12 can be embedded on the opposite side to the first heating zone 12. This is shown in FIG. 5, in which the course of the heating wire 13 is illustrated, wherein the heating wire is not visible because it is embedded in the plastic material of the fitting and the course is indicated schematically. The heating wire winding 4, which is formed by a cohesive wire 13, can thus be embedded in the inventive electroweld fitting 1 in one operating step.

Figure 2:
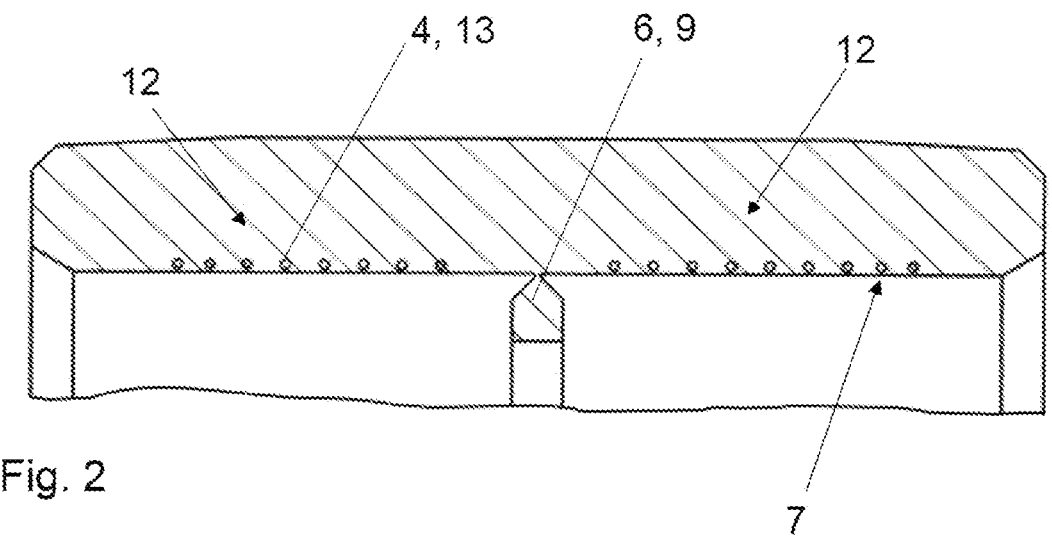
FIG. 2 shows a longitudinal section through an electroweld fitting according to the invention.

FIG. 2 shows the two heating zones 12.

Figure 3:
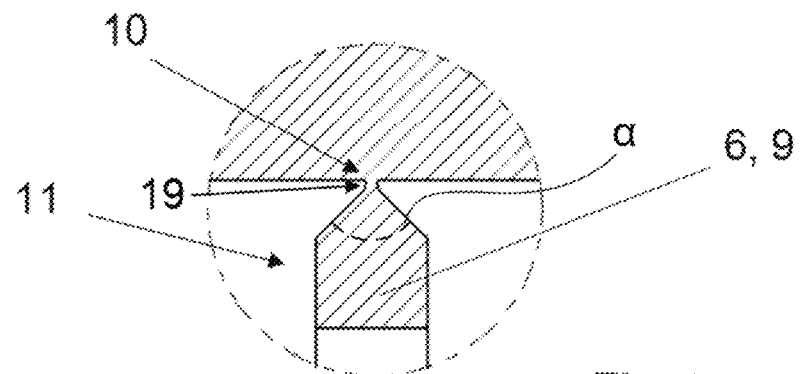
FIG. 3 shows a sectional view through a pipe stop.

It is advantageous if the pipe stop 6, as illustrated in FIG. 3, has a cross-section 9 which has a foot 10 and a head 11. The foot 10 is arranged on the inner lateral surface 7 of the body 2. The body 2 and the pipe stop 6 are designed as a single-piece injection molded part, as well as the contacts 5 also being integrated. The foot 10 has a smaller width in the direction of the longitudinal axis 3 than the head 11 of the pipe stop 6. A predetermined breaking point 19 is arranged at the foot 10 of the pipe stop 6. It is thus ensured that the pipe stop is flexible and resilient and can therefore be easily removed from the inner lateral surface 7 whilst also forming a fixed stop 6.

FIG. 4 shows an inserted pipe end 14 and the function of the pipe stop 6. As illustrated in the top drawing, the pipe end 14 is pushed in as far as the pipe stop 6 and then somewhat further until the pipe stop, as illustrated in the bottom drawing, has tilted in such a way that the stop 6 or the head 11 lies firmly against the inner lateral surface 7 and therefore forms a fixed stop 6 for the insertion depth of the pipes.

The cross-section 9 preferably has an angle α (as illustrated in FIG. 3) between the head 11 and the foot 10 on which an optimum abutment of the pipe stop 6 ensures and forms a stable stop 6. The angle is preferably configured to be >90°.

The drawings in FIG. 6 show possible embodiments for bridging the gap 15 which forms between the inserted pipe ends 14 and an electroweld fitting 1 as a result of the tolerances, wherein, in each case, the drawing illustrated on the left shows the electroweld fitting 1 without the pipe end pushed in and the drawing on the right with the pipe end pushed in. The top variant A shows a groove 16 or a plurality of grooves 16 which are arranged around the end face, wherein knob-like elevations 17 are formed respectively opposite on the inner later surface at the level of the grooves. If the pipe end 14 is now pushed in, the outer diameter of the pipe end 14 presses on the knobs 17 and, as a result of the grooves 16, these can accommodate the dimensions of the diameter resiliently and can be pressed outwards, whereby the pipe end 14 can be pushed into the electroweld fitting 1 and is already simply fixed in place.

As illustrated in the bottom drawings B, a type of lip 18 is alternatively arranged on the end face of the electroweld fitting 1. This should likewise bridge the gap 15 between the pipe outer diameter and the fitting inner diameter.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Electroweld fitting
2 Body
3 Longitudinal axis
4 Heating wire winding
5 Contact, current supply
6 Pipe stop
7 Inner lateral surface
8 Slot
9 Cross-section, pipe stop
10 Foot
11 Head
12 Heating zone
13 Heating wire
14 Pipe end
15 Gap
16 Groove
17 Knob
18 Lip

The invention claimed is:

1. An electroweld fitting made of plastic material for welding plastic pipelines, the electroweld fitting comprising:
a cylindrical body having a longitudinal axis;
a heating wire winding;
contacts configured to conduct an electric current; and
a pipe stop,
wherein the pipe stop is arranged on an inner lateral surface of the cylindrical body,
wherein the pipe stop is flexible,
wherein the cylindrical body and the pipe stop arranged thereon are a one piece injection molded part,
wherein the heating wire winding is an embedded wire in the inner lateral surface of the cylindrical body,
wherein a cross-section of the pipe stop has a foot and a head,
wherein the foot is arranged on the inner lateral surface of the cylindrical body and has a narrower width in the direction of the longitudinal axis than the head, and
wherein a width of the head tapers in a direction of the foot.

2. The electroweld fitting according to claim 1, wherein the pipe stop is resiliently deformable in a direction of the longitudinal axis.

3. The electroweld fitting according to claim 1, wherein the pipe stop is tiltable until a rigid position is achieved.

4. The electroweld fitting according to claim 1, wherein the pipe stop extends at least along a region of a circumference of the inner lateral surface.

5. The electroweld fitting according to claim 1, wherein the pipe stop has at least one slot along a course of the pipe stop on a circumference of the inner lateral surface.

6. The electroweld fitting according to claim 1, wherein the pipe stop is arranged in a center of the cylindrical body in the direction of the longitudinal axis.

7. The electroweld fitting according to claim 1,
wherein the electroweld fitting is a reduction fitting, and
wherein the pipe stop is arranged at an end of a heating
zone of a narrower or smaller inner diameter of the
reduction fitting as compared to at least one other inner
diameter of the reduction fitting.

8. The electroweld fitting according to claim 1, wherein a predetermined breaking point is arranged at the foot of the pipe stop.

9. The electroweld fitting according to claim 1, wherein the taper at the head is formed by an angle $\alpha$ between the foot and the head.

10. The electroweld fitting according to claim 9, wherein the angle $\alpha$ is arranged on both sides of the head.

11. The electroweld fitting according to claim 1, wherein the heating wire winding forms two heating zones, wherein the heating zones each have a plurality of windings, wherein the two heating zones are connected to one another.

12. The electroweld fitting according to claim 1, wherein the cross-section of the pipe stop extends in a constant manner over a course along a circumference of the inner lateral surface.

13. The electroweld fitting according to claim 8, wherein the predetermined breaking point is arranged along the pipe stop and along the inner lateral surface from a start of the pipe stop to the end of the pipe stop.

14. The electroweld fitting according to claim 9, wherein the angle $\alpha$ is greater than 90°.

\* \* \* \* \*